Figure 2:
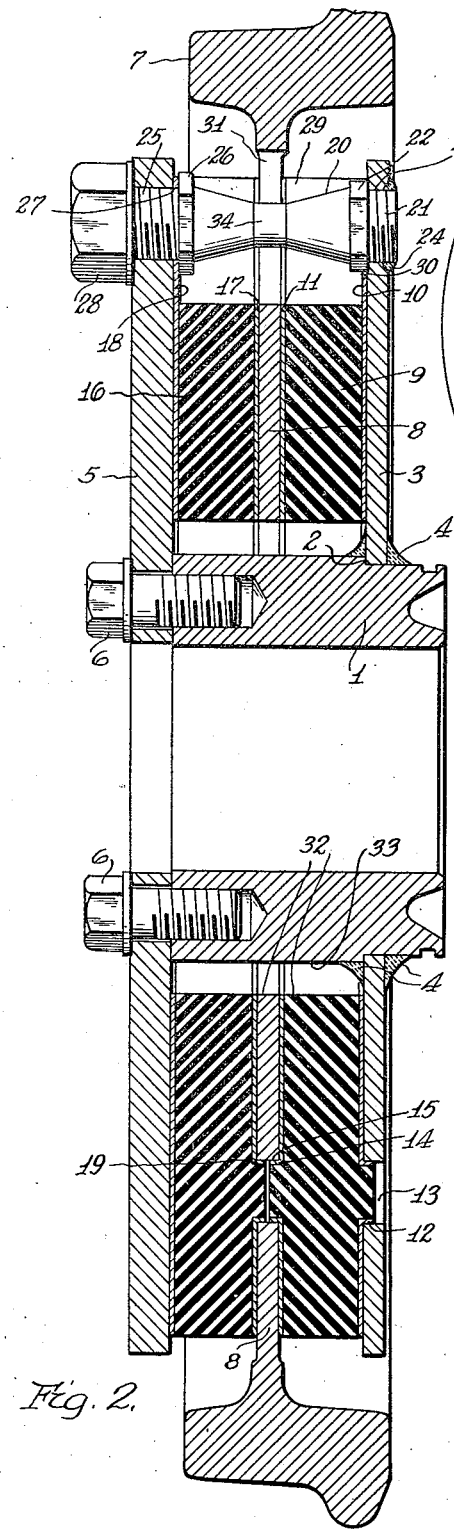

Sept. 8, 1942.    E. H. PIRON    2,295,270
RESILIENT WHEEL
Filed May 25, 1940    2 Sheets-Sheet 1

INVENTOR.
Emil H. Piron
BY
Windsor Davis
ATTORNEY.

Sept. 8, 1942.  E. H. PIRON  2,295,270
RESILIENT WHEEL
Filed May 25, 1940  2 Sheets-Sheet 2

INVENTOR.
Emil H. Piron
BY
Windsor Davis
ATTORNEY.

Patented Sept. 8, 1942

2,295,270

UNITED STATES PATENT OFFICE 2,295,270

RESILIENT WHEEL

Emil H. Piron, New York, N. Y., assignor to Transit Research Corporation, a corporation of New York Application May 25, 1940, Serial No. 337,165

14 Claims. (Cl. 295—11)

This invention relates to resilient wheels for rail vehicles, and has for its primary object to provide a wheel embodying an unusually high degree of resiliency.

More specifically, the main object is to provide a wheel embodying a greater degree of resiliency than is ordinarily obtainable in a wheel capable of installation on the trucks of street cars. Structural limitations, presented by definite requirements as to the length of the axles, and also by the presence of truck frame members and spring pots, preclude installation of a wheel of greater than a given width. The resiliency of the wheel, and its sound dampening ability, are to a great extent controlled by the width of the spring elements, interposed between the rim and hub, and composed of rubber or its equivalent mainly acting in shear. According to this invention, the wheel structure is so designed that an unusually great thickness of rubber may be used therein, thus increasing the shear distortion, and resulting in a wheel of greater resiliency and greater sound dampening qualities.

A wheel such as here contemplated comprises a hub and a rim having outwardly and inwardly radiating plates connected thereto and separated one from another by elastic springing elements, which constitute resilient means for connecting the hub and rim. In one form, the hub has two outwardly radiating plates and the rim has an inwardly radiating plate or flange supported therebetween by the elastic elements. In this case one of the hub plates is permanently secured to the hub near one end thereof, the other hub plate is secured to the other end of the hub, and the two hub plates are connected near their peripheries by stud means which extends loosely through the rim plate or flange. In an alternative form two plates are secured to the rim and one to the hub, in which case the inner peripheral portions of the rim plates are connected by stud means extending loosely through the hub plate.

It is another object of the invention to provide a wheel construction of the type above mentioned wherein the stud means is flexible. It was heretofore deemed essential that the stud means be perfectly rigid. By making them flexible, however, elasticity of the wheel is increased and the studs, instead of taking all of the bending stresses and thereby being subject to breakage, share the bending movements with the plates, with the result that stresses are more evenly distributed between studs and plates instead of being concentrated mainly on studs and breakage of studs is avoided under the action of forces which heretofore would cause breakage.

Another object of the invention is to provide a wheel of the type above mentioned embodying a greater clearance between the spring means and studs than is present between the spring means and the hub. Thus, instead of the spring means bottoming on the studs in the case of excessive overloading or impacts, the spring means seats directly against the hub.

Another object of the invention is to provide a wheel structure of the type above referred to wherein the arrangement of the plates is such that they may be readily removed for the purpose of replacing the springing means.

Figure 1:
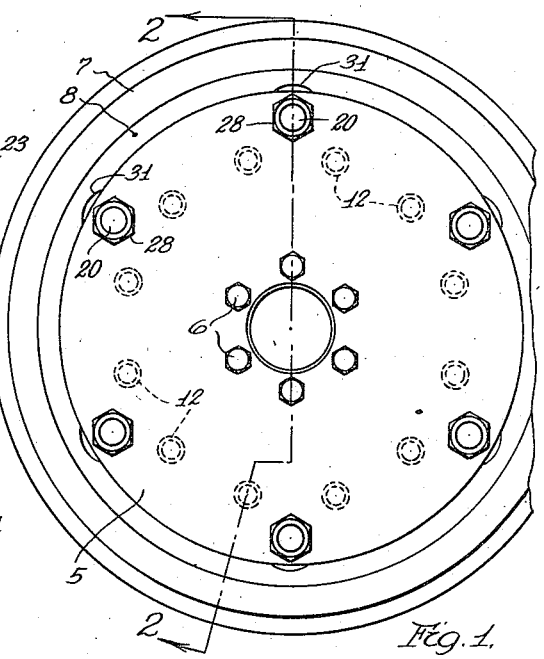
Figure 3:
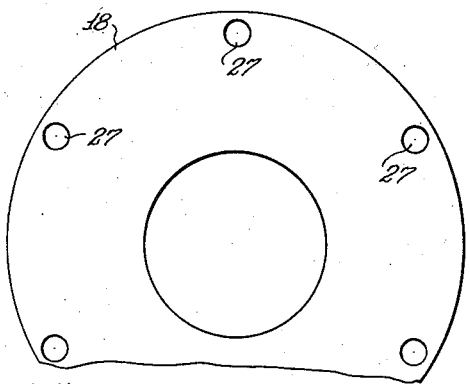
Figure 4:
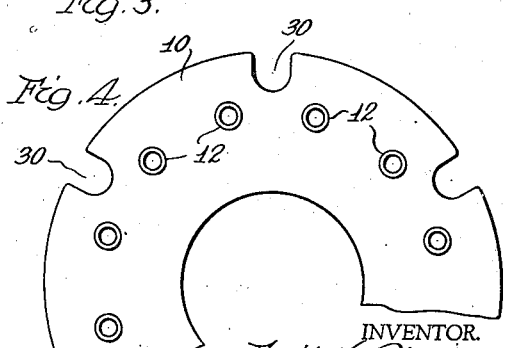
Figure 6:
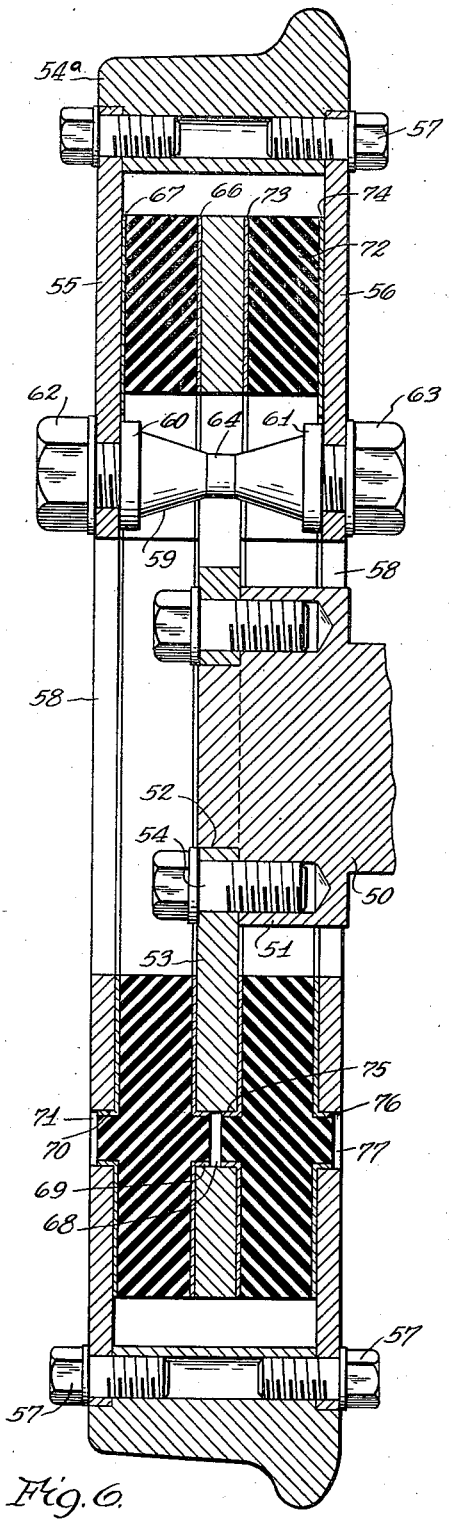
Figure 5:
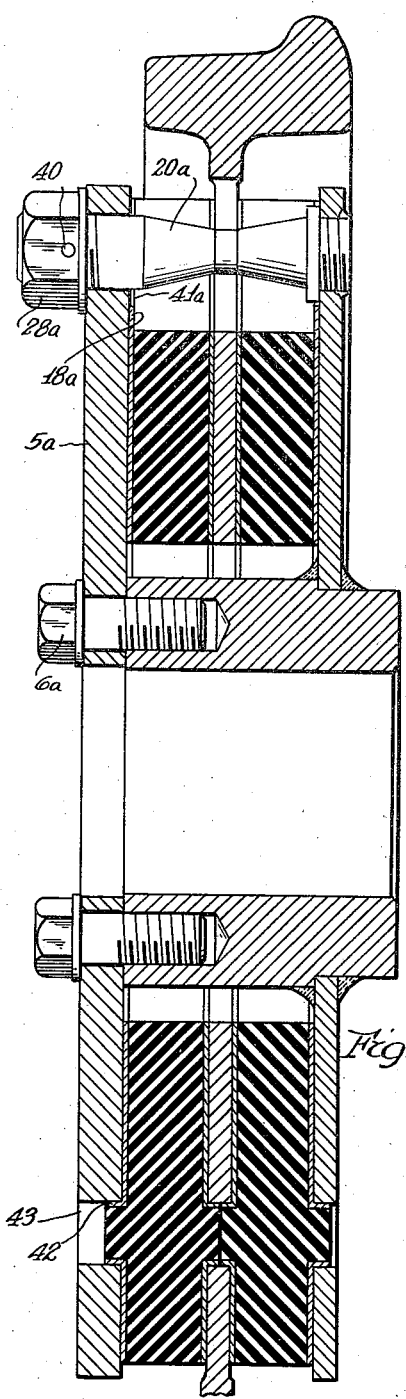

Other objects and advantages will become more fully apparent as reference is made to the accompanying drawings wherein my invention is illustrated, and in which Fig. 1 is a side elevation of a wheel, Fig. 2 is a section taken on the line 2—2 of Fig. 1, Fig. 3 is a fragmental elevation of one of the spring discs, Fig. 4 is a fragmental elevation of another of the spring discs, Fig. 5 is a vertical cross section illustrating an alternative construction of the wheel spring, and Fig. 6 is a vertical section illustrating a reversal of the wheel and hub plates.

More particularly, 1 designates a hub having a reduced end forming an external shoulder 2. A radial plate 3 is placed upon the reduced end, is slipped into contact with the shoulder and then welded in place as indicated at 4. Secured upon the outer end of the hub 1 is a second radial plate 5 which is removably secured in place by a multiplicity of screws 6, and which coacts with the plate 3 in forming an outwardly directed radially extending channel. The plate 5 is comparatively thick, it being sufficiently heavy to withstand bending stresses. The two plates 3 and 5 are accurately spaced apart by the hub structure, by engagement of the plate 3 with the shoulder 2, and by engagement of the plate 5 with the end of the hub 1.

A tire, or rim, or tread member 7 is formed with an inwardly radiating flange 8, which extends radially inward between the two plates 3 and 5. The flange 8 is separated from the plate 3 by an elastic spring 9, formed of rubber or its equivalent, and having thin metal discs 10 and 11 surface bonded to opposite sides thereof. These springs constitute resilient cushioning rings. The disc 10 has upstanding dowels 12 which extend into dowel holes 13 in the plate 3 to support the spring 9 with respect to the plate 3, and the disc 11 has similar dowels 14 extending into similar dowel holes 15 in the flange 8 to retain the spring 9 with respect to the flange.

The flange 8 is separated from the plate 5 by an elastic spring 16 having a thin metal disc 17 surface bonded to one side thereof and a thin metal disc 18 surface bonded to its other side. The disc 17 has upstanding dowels 19 thereon which extend into the dowel holes 15 of the flange, to retain the spring 16 with respect to the flange. The discs 11 and 17 are scalloped at their outer periphery to correspond to the scallops in the rubber elements 9 and 16.

A multiplicity of tie bolts 20 are provided for connecting the two plates 3 and 5 at circumferentially spaced points adjacent their peripheries. These tie bolts have screwthreaded ends 21 and shoulders 22 adjacent thereto. The screwthreaded ends 21 are screwed into internally threaded apertures 23 in the plate 3, and after the shoulders 22 contact the plate 3 the end 21 is welded to the plate as indicated at 24. The other end of each tie bolt 20 is screwthreaded at 25 and has a shoulder at 26. The end 25 extends through an aperture 27 in the disc 18, through the plate 5, and has a nut 28 for clamping the interposed portion of the plate 5 and disc 18 against the shoulder 27.

The elastic springs 9 and 16 have notches or scallops 29, one of which is shown in Fig. 2, through which the tie-bolts 20 extend, and the disc 10 has notches 30 providing a clearance around the bolt shoulders 22. The flange 8 has openings 31 through which the tie-bolts 20 extend, and these openings are so proportioned that the distance between the walls thereof is greater than the distance between the inner periphery 32 of the flange 8 and the adjacent surface 33 of the hub. This arrangement results in engagement of the flange 8 on the hub 1, rather than with the tie-bolts 20, in the case of a greatly abnormal load or impact.

The tie-bolts 20 are reduced in diameter intermediate their ends, as indicated at 34, thereby weakening the bolts in these regions, and rendering them flexible. If these bolts are formed too rigid it is found that they take all stresses between the plates 3 and 5 when bending movement thereof occurs and they break, whereas if the bolts are sufficiently flexible to share bending movements with the plates 3 and 5 they do not break. By reducing the size of the tie-bolts as compared to the size of those heretofore used smaller recesses accommodate the bolts, and the smaller recesses result in the presence of more rubber.

The wheel shown in Fig. 5 is similar to that described above, and differs only in the form of tie-bolt employed, and in the form of the disc 18. In this case the shoulder 26 is eliminated from the tie-bolt 20a, and the nut 28a, after being positioned correctly, is retained in place by a pin 40. The bolt is otherwise the same as the bolt 20, and may be flexed as above described, and in addition the plates 3a and 5a may be moved toward each other because of the ability of the bolt to move relative to the plate 5a.

In this case the disc 18a is recessed at 41a similarly to the disc 10, above described, to accommodate the bolt 20a, and is retained with respect to the plate 5a by dowels, one of which is shown at 42 as extending into the dowel hole 43.

In Fig. 6 there is illustrated a hub 50 having a flange 51 thereon and an axially extending bearing portion 52. A radially extending plate 53 is secured upon the bearing portion 52 and against the flange 51 by a multiplicity of screws 54. A rim or tire member 54a has plates 55 and 56 secured thereto by bolts 57 and extending radially inward toward the hub on opposite sides of the plate 53, and having central openings 58 providing clearance therebetween and the hub. Adjacent the openings 58 are a multiplicity of tie-bolts 59 having shoulders 60 and 61 engaging respective plates 55 and 56, and having nuts 62 and 63 on respective ends clamping the plates 55 and 56 against the shoulders 60 and 61. The bolts 59 are reduced in diameter intermediate their ends, as indicated at 64, to enable flexing thereof.

An elastic spring separates the plate 53 from the plate 55, and this spring has thin metal discs 66 and 67 surface bonded to opposite sides thereof. The disc 66 has upstanding dowels 68 thereon which extend into dowel holes 69 in the plate 53, and the disc 67 has upstanding dowels 70 which extend into dowel holes 71 in the plate 55. The plate 53 is separated from the plate 56 by an elastic spring 72 having thin metal discs 73 and 74 surface bonded on opposite sides thereof. The disc 73 has upstanding dowels 75 thereon which extend into the dowel holes 68, and the disc 74 has upstanding dowels 76 which extend into dowel holes 77 in the plate 56.

Each of the forms above described is characterized by exceptionally thick elastic spring members, which results in a thickness such that when initial compression is imposed thereon there will still be sufficient compression after "set" for all operating purposes. One of the main purposes is to provide a wheel structure for accommodating elastic springs of increased thickness, to incorporate a high degree of resiliency, and greater sound dampening characteristics. This is accomplished by the structure shown, which is also advantageous in the respect that the springs and rim may be readily removed and replaced, in the event replacement is necessary. As shown in Fig. 1, removal of the nuts 28 and the bolts 6 enables removal of the springs and rim. In Fig. 5, removal of the nuts 28a and the bolts 6a enables removal of the springs and tire, and in Fig. 6 removal of the bolts 54 and 57 permits removal of the tire and springs, and removal of the nuts 62 and 63 enables removal of the springs from the tire.

Although specific embodiments of the invention have been illustrated and described, it will be understood that various changes may be made within the scope of the appended claims without departing from the spirit of the invention, and such changes are contemplated.

What is claimed is:

1. A resilient wheel comprising a hub and rim, plates radiating outwardly and inwardly from the hub and rim respectively, the plates being three in number with the innermost plate separated from the two outermost by ring-like elastic springs having inner and outer peripheries, rigid spacing and tying means connecting the outermost plates in zones adjacent peripheral portions of said springs, and stud means rigidly attached to and connecting said plates adjacent the remaining peripheral portions of said springs, said stud means having midportions reduced to a cross section smaller than the ends thereof flexible to the extent that slight bending of the plates to which said stud means is connected with respect to the other thereof may occur without fracture of said stud means.

2. A rail wheel comprising a hub having two parallel plates radiating outwardly therefrom, a tire having a third plate radiating inwardly therefrom and positioned between said parallel plates, elastic springs separating said third plate from said parallel plates and acting as a springing medium for relative movements therebetween, and stud means extending freely through openings in said third plate and connecting said parallel plates near their peripheries, said stud means having a midportion reduced in cross section with respect to its enlarged ends whereby to provide flexibility thereof.

3. A rail wheel comprising a hub having two parallel plates radiating outwardly therefrom, a tire having a third plate radiating inwardly therefrom and positioned between said parallel plates, elastic springs separating said third plate from said parallel plates and acting as a springing medium for relative movements therebetween, and stud means extending freely through openings in said third plate and connecting said parallel plates near their peripheries, said stud means being fixedly secured to one of said parallel plates and removably secured to the other thereof and of reduced cross section at its midportion.

4. A rail wheel comprising a hub having two parallel plates radiating outwardly therefrom, a tire having a third plate radiating inwardly therefrom and positioned between said parallel plates, elastic springs separating said third plate from said parallel plates and acting as a springing medium for relative movements therebetween, said elastic springs each comprising a disc of elastic plastic material having discs of metal surface-bonded to opposite sides thereof, one of said discs of elastic plastic material and one of said discs of metal being scalloped at their outer peripheries, the other of said discs of metal having a series of holes inwardly of its outer periphery, said scallops each being axially aligned with one of said holes, and stud means residing in said scallops extending through said holes and through all of said plate means for connecting said parallel plates together, said stud means each having a shoulder thereon for engaging the side walls of said holes whereby the disc having said holes is snared between said shoulders and the adjacent parallel plate.

5. A rail wheel comprising a hub having two parallel plates radiating therefrom, one of said plates being permanently secured to said hub and the other removable therefrom, a tread member having a flange radiating inwardly therefrom residing between said parallel plates, resilient rings separating said flange from said parallel plates and serving as a springing means therebetween, said resilient rings each having side plates vulcanized to opposite sides thereof, said rings and three of said side plates each being scalloped near the outer periphery thereof, the remaining fourth side plate being placed adjacent the plate removable from said hub and having holes aligned with said scallops, and studs extending through said plates for connecting same together, freely through holes in said flange, and freely through said scallops, said studs each being permanently secured to the plate permanently secured to said hub and each having a shoulder engaging the regions around the holes in said fourth side plate.

6. In combination, a rail wheel hub having an outwardly directed radially extending channel, a tread member having a radially inwardly directed flange disposed within said channel, resilient cushioning rings disposed between the inner faces of said channel and the opposite surfaces of said flange each having side plates vulcanized thereto and engaging said faces and surfaces, means engaging said hub for exerting an axial compressive force at the inner end of said channel, and stud means about the radial outer periphery of said channel permanently secured to one wall thereof for exerting an axial compressive force about said periphery, said stud means extending freely through scallops in both of said cushioning rings and through scallops in at least two of said side plates, said stud means each having a shoulder formed near one end thereof, that portion of said stud means outwardly of said shoulder extending through holes in one wall of said chamber and through holes in the side plate adjacent thereto whereby said adjacent plate is snared between said shoulders and said wall.

7. In combination, a hub having an outwardly directed radially extending channel, a tread member having a radially inwardly directed flange disposed within said channel, resilient cushioning rings disposed between the inner faces of said channel and the opposite surfaces of said flange each having side plates surface bonded thereto and engaging said faces and surfaces, stud means arranged about the radially outer periphery of said channel for exerting an axial compressive force about said periphery, one plate of one ring being engaged by said stud means and being secured against one of said faces thereby, the plate of the other ring adjacent said other face being recessed to provide a clearance with respect to said stud means and having dowels engaging the adjacent channel wall, and the remaining plates having dowel means coacting with the flange.

8. In combination, a rail wheel hub having an outwardly directed radially extending channel, a tread member having a radially inwardly directed flange disposed within said channel, resilient cushioning rings disposed between the inner radial faces of said channel and the opposite radial surfaces of said flange each having side plates vulcanized thereto and engaging said faces and surfaces, means engaging said hub for exerting an axial compressive force at the inner end of said channel, and stud means about the radial outer periphery of said channel for exerting an axial compressive force about said periphery, said stud means extending freely through scallops in both of said cushioning rings and through scallops in three of said side plates, said stud means each having a shoulder formed near one end thereof, that portion of said stud means outwardly of said shoulder extending through holes in the fourth of said side plates and through one wall of said channel whereby said fourth plate is snared between said shoulders and said wall.

9. In combination, a hub having an outwardly directed radially extending channel, a tread member having a radially inwardly directed flange disposed within said channel, resilient cushioning rings disposed between the inner faces of said channel and the opposite surfaces of said flange each having side plates surface bonded thereto and engaging said faces and surfaces, stud means arranged about the radially outer periphery of said channel for exerting an axial compressive force about said periphery, one plate of one ring being engaged by said stud means and being secured against one of said faces thereby, the plate of the other ring adjacent said other face being recessed to provide a clearance with respect to said stud means and having dowels engaging the adjacent channel wall, and the remaining plates having dowel means coacting with the flange, said stud means comprising tie-bolts having flexible portions intermediate their ends.

10. A rail wheel comprising a hub having a plate permanently secured thereto and radiating therefrom, a second plate parallel to the first named plate abutting one end of said hub and having a plurality of threaded means grouped around the center thereof removably securing said second plate to said hub, a tread member having a flange radiating inwardly therefrom and residing between said plates, cushioning rings separating said flange from said plates and acting as a spring for relative movements therebetween, and stud means connecting said plates near the outer peripheries of said rings, said stud means each being permanently secured to the plate permanently secured to said hub and having a shoulder near the other end engaging the other of said plates whereby to define the space between said plates, said stud means each being substantially reduced at its midportion to allow slight movements between said plates without fracturing of said stud means.

11. A resilient wheel comprising a hub and rim, plates radiating outwardly and inwardly from the hub and rim respectively, the plates being three in number with the innermost plate completely separated from the two outermost by ring-like elastic springs and movable with respect thereto by deflection of said elastic springs in shear, bending and compression, rigid spacing and tying means connecting the outermost plates in zones spaced from peripheral portions of said springs and inner plate, and stud means having their smallest diameter midway between said outermost plates connecting said outermost plates adjacent the remaining peripheral portions of said springs, said elastic springs and inner plate being notched and relieved respectively in such manner as to provide a greater clearance between the stud means and the inner plate and springs than is present between said inner plate and said rigid spacing and typing means.

12. A wheel comprising a hub, a radial plate secured to said hub, a rim member radially spaced from said plate, a pair of plates extending radially inwardly from said rim and disposed on opposite sides of the hub plate, elastic cushioning means separating the rim plates from the hub plate, means retaining the cushioning means between said plates, stud means having a smallest diameter midway between the members of said pair of plates connecting the inner peripheral portions of said rim plates, said stud means extending freely through said hub plate, said stud means being disposed radially outwardly of the inner peripheries of said cushioning means, said cushioning means having stud accommodating recesses and being so formed as to provide a greater clearance with the stud means than is present between the cushioning means and the rim.

13. Cushioning means for a resilient wheel having hub and rim connecting means including radial plates arranged in parallel relation with one between two others, comprising resilient disclike elements between the inner and outer plates, and a series of studs rigidly attached to and connecting peripheral portions of the outer plates, said studs having portions intermediate their ends reduced to a diameter smaller than the plate engaging ends thereof enabling flexing thereof in the presence of extrinsic forces of a magnitude sufficient to flex said plates.

14. A springing element for a resilient rail wheel comprising a ring of rubber having a plurality of scallops in its outer periphery and thin metallic discs surface-bonded to the opposite faces thereof, one of said discs having scallops in its outer periphery corresponding to the scallops in said ring of rubber and having dowels arising therefrom on the side away from said disc, the other of said discs having a smooth outer periphery and a plurality of apertures therethrough inwardly of said periphery, said apertures being in alignment with said scallops.

EMIL H. PIRON.